United States Patent
Laurent et al.

(12)

(10) Patent No.: US 6,342,580 B1
(45) Date of Patent: Jan. 29, 2002

(54) PROCESS FOR OBTAINING AMINOPOLYAMIDE-EPICHLOROHYDRIN RESINS WITH A 1,3-DICHLORO-2-PROPANOL CONTENT WHICH IS UNDETECTABLE BY ORDINARY MEANS OF VAPOR-PHASE CHROMATOGRAPHY

(75) Inventors: Henri Laurent, Compiegne; Thierry Dreyfus, Margny les Compiegne; Chantal Poulet, Chiry Ourscamp; Serge Quillet, Viroflay, all of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/495,928

(22) Filed: Feb. 2, 2000

Related U.S. Application Data

(63) Continuation-in-part of application No. 08/678,350, filed on Jul. 11, 1996, now abandoned.

(30) Foreign Application Priority Data

Jul. 11, 1995 (FR) .............................. 95 08359

(51) Int. Cl.$^7$ .............................. C08F 6/00; C08K 3/04
(52) U.S. Cl. ................. 528/502; 528/482; 528/489; 523/403; 523/416; 523/417; 523/426; 524/606; 524/608; 524/612
(58) Field of Search ............................. 528/502, 482, 528/489; 523/403, 416, 417, 426; 524/606, 608, 612

(56) References Cited

FOREIGN PATENT DOCUMENTS

| EP | 0 515 750 A2 * | 2/1992 | |
|---|---|---|---|
| JP | 2-53 010692 | 1/1978 | |
| SU | A-1 786 214 | 3/1991 | |
| WO | WO 93/21384 | 4/1992 | .................... 17/55 |

OTHER PUBLICATIONS

EPO Search Report dated Oct. 16, 1996, All references previously submitted with IDS filed Jul. 11, 1996.

Sierka, et al., 1998 Environmental Conference, TAPPI Proceedings, pp. 439–442.

* cited by examiner

*Primary Examiner*—James J. Seidleck
*Assistant Examiner*—Olga Asinovsky
(74) *Attorney, Agent, or Firm*—Smith, Gambrell & Russell, LLP

(57) ABSTRACT

A process for obtaining aminopolyamide-epichlorohydrin resins with a 1,3-dichloro-2-propanol content which is undetectable by ordinary means of vapor-phase chromatography. The process consists of passing the products resulting from the successive condensation of aminopolyamides and epichlorohydrin through two columns of activated carbon. In this way, aqueous resins are obtained which are free of toxic products, and which are particularly valuable as wet strength additives in the manufacture of papers for medical, cosmetic or food contact uses.

20 Claims, 1 Drawing Sheet

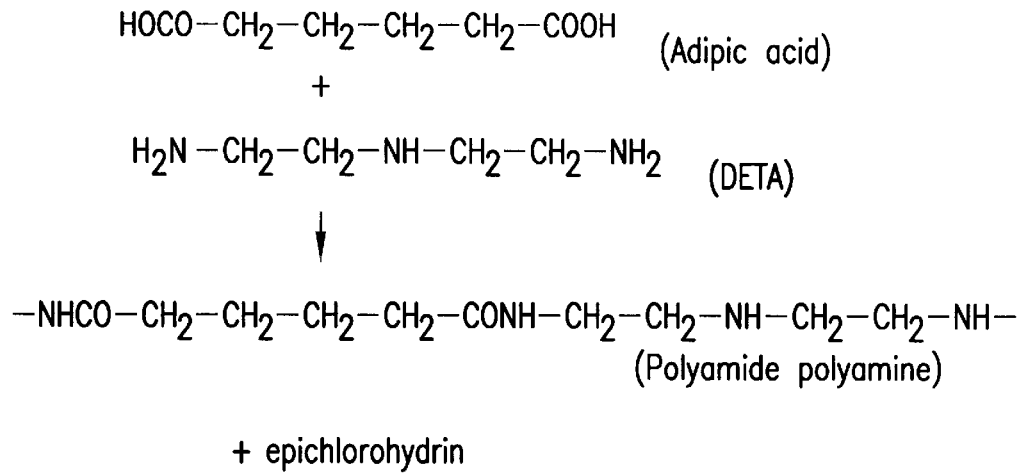
(Polyamide polyamine)
+ epichlorohydrin
↓ ↓ ↓
(a) (b) (c)
(a) = azetidinium structure
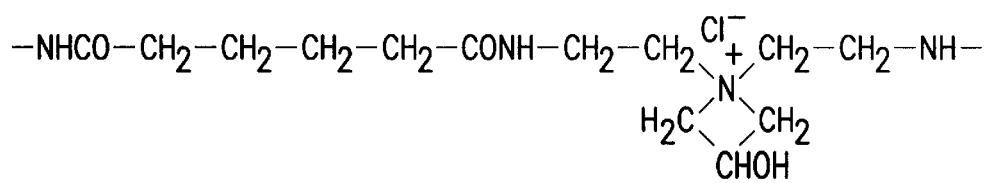
(b) = chloraminopropanol structure
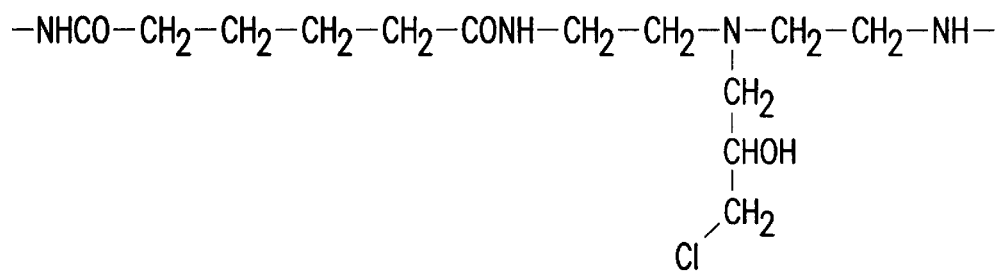
(c)  secondary products = epichlorohydrin,
1, 3-dichloro-2-propanol, 3-monocholoro-1, 2-propanediol
FIGURE (sole figure)

PROCESS FOR OBTAINING AMINOPOLYAMIDE-EPICHLOROHYDRIN RESINS WITH A 1,3-DICHLORO-2-PROPANOL CONTENT WHICH IS UNDETECTABLE BY ORDINARY MEANS OF VAPOR-PHASE CHROMATOGRAPHY

CROSS-REFERENCE TO RELATED APPLICATION

This application is a continuation-in-part of U.S. application Ser. No. 08/678,350, filed Jul. 11, 1996 is now ABN. U.S. application Ser. No. 08/678,350 is incorporated herein by reference.

FIELD OF THE INVENTION

The present invention relates to additives of the aminopolyamide-epichlorohydrin (PAE) type used to increase the wet strength of paper, and more precisely to an improvement for limiting its impact on the environment.

BACKGROUND OF THE INVENTION

The paper has natural mechanical strength due to the interlocking of millions of "wood" fibers. This dry strength is due to the numerous hydrogen bonds established during the drying of the paper. During the water evaporation process, the acid hydrogens of the fibers attract one another so as to form hydrogen bonds. In the presence of water, the mechanical strength of the sheet of paper deteriorates rapidly as the interfibrous hydrogen bonds disappear: water will progressively separate the fibrous lattice by weakening the fibers themselves.

In order to consolidate the fibrous mat and to partially prevent the water from reaching the hydroxyl groups of the fibers, chemists have proposed improving the strength of the paper by, among other things, adding thermosetting resins, more specifically thermosetting resins with cationic characteristics to facilitate their adsorption into the fibers, which have certain anionic characteristics. Two principal systems have been developed and have competed on the market: the first uses aminoplast(urea-formaldehyde or melamine-formaldehyde) resins, and the second system, developed in the 1960s uses a polyamide-polyamine-epichlorohydrin (PAE) resin in a neutral medium. The latter process, which has expanded since its creation, has numerous advantages over the aminoplast resins used in an acid medium (pH 4.5–5), for example the fact that it can use less expensive fillers such as calcium carbonate, and that it causes less corrosion of industrial equipment. These resins have another advantage over the aminoplast resins in that they do not include formaldehyde, which is considered to be a noxious element. These PAE resins, due to the fact that the process for obtaining them uses epichlorohydrin (EPC), contain organochloric products, and because of this they are subject to regulation which severely limits the emission into the environment of organic halogens which are adsorbable by activated carbons. These products, designated AOX (for "adsorbable organic halogens"), are known to be measurable in water in accordance with various standards (DIN 38409, SCAN-W9:89, ISO 9562).

PAE resins are manufactured industrially in two steps. The first step combines a dicarboxylic acid, adiphic acid, and diethylenetriamine (DETA), which are condensed at a high temperature. The polyamide polyamine resin (PA) formed in this way reacts with the epichlorohydrin to form the PAE resin, which is a polymer of low molecular weight which can be cross-linked, and which is stabilized in an acid medium.

The reactions for obtaining the polyamide-polyamine-epichlorohydrin resin (PAE) are summarized in the FIGURE. The epichlorohydrin reacts with the secondary amines, and probably also the primary amines, by combining azetidinium groups on one side and adding chlorohydroxypropane groups on the other side, the PAE resin being a oligomer which contains, in a random distribution, azetidinium groups of this type with inorganic chlorine, and lateral groups with organic chlorine. The reaction which consists of the alkylation of the PA by the epichlorohydrin is incomplete. After the reaction, several hundred ppm of free epichlorohydrin remains, part of which is hydrolyzed in an aqueous medium, chiefly 1,3-dichloro-2-propanol (DCP) and also 3-monochlore-1,2propanediol (MCPD), products of low molecular weight. These products are AOXs. DPC is recognized to be toxic and mutagenic. MCPD is also recognized to be toxic and is feared to be mutagenic. Their presence in products used for treating paper and in the effluent from paper manufacturing thus constitutes a troubling problem. Their measurement is easily achieved by means of gas chromatography in a Superwax® column with a polyethylene glycol phase with flame ionization detection.

In order to solve the AOX problem, the principal PAE resin suppliers have developed new resins with reduced AOX and organic chlorine contents (for example Bayer's U.S. Pat. No. 4,857,586 or European patent 540,943). The use of synthesis to reduce the DCP content to about 550 ppm is well known. As a result of this, however, the resin progressively loses its ability to function as a wet strength additive for the paper. So these resins, which are reputed to have a low 1,3-dichloro-2-propanol content, nevertheless contain quantities of it which are non-negligible, on the order of several hundred ppm, some of which will remain in the paper and some of which will pass into the white water of paper mills. All of these organochlorines can be sources of contamination for the environment (see Devore, David I., Clungeon, Nancy S., Fischer, Stephen A., Tappi Journal 74, 12, 1991, 135–141, Henkel Corp.). One solution which seems to present itself is the retreatment of the resin through adsorbents in order to extract these undesirable chloric compounds from it. International patent application WO 92/22.601 therefore proposes a retreatment through ion exchange resins; but here again, the resin, purified of DCP, perceptibly loses its wet strength qualities.

International patent application WO 93/21.384 (E.I. Du Pont de Nemours and Co.) discloses the possibility of reducing the secondary products resulting from the hydrolysis of the epichlorohydrin in a single percolation through a bed of adsorbent, and more precisely through a bed of ion exchange resins.

SUMMARY OF THE INVENTION

As a solution to this unsolved problem, Applicants propose a very effective and economical process, which is the object of the present invention, for producing a PAE resin which contains only traces of the toxic organochloric products resulting from the degradation of the epichlorohydrin, which are ordinarily undetectable, by selectively trapping the DPC, the MCPD and the EPC present in the PAE resins in activated carbon.

In accordance with the present invention there is provided a process for lowering EPC, DCP and MCPD content of PAE resins comprising passing aqueous polyamide-polyamine-epichlorohydrin (PAE) resins with a dry extract between 2 and 60% through a first activated carbon bed until 1,3-dichloro-2-propanol (DCP) appears in the percolate, then through a second activated carbon bed until 3-monochloro-1,2-propanediol (MCPD) appears in the percolate.

In accordance with another aspect of the present invention, there is provided a composition for treating paper comprising an aqueous polyamide-polyamine-epichlorohydrin resin having a dry extract between 2 and 60%, a 1,3-dichloro-2-propanol content relative to its dry extract that is not measurable, a 3-monochloro-1,2-propanediol content less than 250 ppm and an organic chlorine content, also relative to its dry extract, that no less than 1%.

BRIEF DESCRIPTION OF DRAWING

The FIGURE summarizes reactions for obtaining the polyamide-polyamine-epichlorohydrin resin (PAE).

DESCRIPTION OF SPECIFIC EMBODIMENTS

During tests of adsorption in activated carbons, it was determined that the MCPD was not trapped at the same time as DCP, probably because MCPD is displaced in the carbon by the DCP, which is richer in organic chlorine. However, this phenomenon can be used to economically produce a PAE according to the process of the invention, which consists of a percolation in two steps, the first of which consists of passing a crude resin through a carbon column, stopping the percolation as soon as the DCP appears in the PAE issuing from the column, and the second of which consists of passing this DCP-free PAE resin through a column of virgin carbon in order to eliminate the MCPD from it.

As used herein "virgin carbon" means that the carbon is (i) fresh activated carbon or (ii) regenerated activated carbon supplemented in-part with fresh activated carbon. When the virgin carbon is a mixture of fresh activated carbon and regenerated activated carbon, it is preferred that the mixture contain at least 8% by weight of fresh activated carbon.

In practice, a PAE in the form of an aqueous solution with a dry extract between 2 and 60%, whose DCP content expressed in relation to the dry resin is no greater than 80,000 ppm, preferably between 500 and 80,000 ppm, is sent through a first column of activated carbon, and the percolation is stopped as soon as DCP appears in the outgoing resin. The resins which issue from this first percolation have a global DCP content, expressed in relation to the dry resin, which is never greater than 500 ppm, but MCPD contents, expressed in the same way, which are between 250 and 40,000 ppm. Satisfactory results are obtained at this level by working with ratios of the weight of industrial resin to the weight of activated carbon used on the order of 20 (on the order of 2.5 if the resin is expressed in dry extract). These resins undergo a second percolation through the column of virgin carbon. This percolation is stopped when MCPD appears in the outgoing resin. A global MCPD content which is never greater than 250 ppm is quite easily obtained by working with ratios of the weight of industrial resin to the weight of carbon used on the order of 40 (on the order of 5 if the resin is expressed in dry extract).

The PAE resins obtained in this way have very low DCP and MCPD contents, as well as a very low EPC content. It is possible to reach DCP contents which are practically null for certain specific uses, for example for filter papers used in the preparation of coffee. It is noted that, surprisingly, the activated carbon did not extract the organic chlorine, which is attributed to the lateral chlorohydroxypropane branches of the PAE molecule. It may be assumed that these components of the PAE, which are responsible for retaining some 3,000 ppm of organic chlorine, play a non-negligible part in the effectiveness of the product as a wet strength additive, and that it is not desirable to eliminate them from paper treatment compositions in order to comply with the AOX standards, especially since these products are attached to the cellulose fibers and rightly do not contribute to the AOX content of the waste water. An unexpected an unexplained consequence is that not only do the resins treated according to the invention not lose their capacity to give the paper wet strength, but also an increase in wet strength of up to a 10% is recorded in papers treated with other resins.

The carbons used for the invention are generally those which are recommended for the bleaching and purification of aqueous solutions, with an iodine number (in accordance with ASTM standard D 4607–86) of at least 500 mg/g, and preferably greater than 900 mg/g.

The process according to the invention does not globally produce DCP or other toxic products. While other processes cause these products to concentrate in the adsorbent, as a result of which the problem resides in their elimination, activated carbon, because it is destroyed or regenerated at high temperatures, transforms them into water, $CO_2$ and HCl, which may be eliminated without danger.

The paper treatment compositions intended to give the paper wet strength which essentially include an aqueous PAE resin such as may be obtained by the process according to the invention, with a dry extract between 2 and 60%, whose MCPD content is no greater than 250 ppm and whose organic chlorine content, also relative to its dry extract, is no lower than 1% are a subject of the present invention. They are particularly valuable for the manufacture of paper for medical, cosmetic, or food contact uses, or of certain papers whose industrial application requires great purity, such as photographic papers. These are also a subject of the invention.

EXAMPLE

Example 1

An industrial resin R4948 of CECA S.A., whose characteristics appear above, is passed through a carbon column which contains 220 g of granulated carbon with an iodine number of 1,000 (CECARBON® 12×40 of ELF ATOCHEM N.A.), which has previously been saturated with water. Thirty-five samples of filtered resin of 100 g each are successively collected at the base of the column. The results in terms of epichlorohydrin (EPC), DCP and MCPD are presented in the table below.

| Volume percolated | EPC ppm | DCP ppm | MCPD ppm | DE % |
| --- | --- | --- | --- | --- |
| Initial resin | 16 | 420 | 200 | 13.2 |
| Sample No. 1 | <5 | <5 | <5 | 3.7 |
| (No. 5) | <5 | <5 | 15 | 9.7 |
| (No. 10) | <5 | <5 | 30 | 11.1 |
| (No. 20) | <5 | <5 | 53 | 12.6 |
| (No. 25) | <5 | <5 | 67 | 12.3 |
| (No. 30) | <5 | 7 | 150 | 12.9 |
| (No. 35) | <5 | 8 | 163 | 13 |

It is noted that the MCPD comes out quite early (15 ppm in Sample No. 5), whereas the DCP appears quite late (7 ppm in Sample No. 30). It is also noted in passing that almost all of the epichlorohydrin is retained. 3.5 kg of resin, the global dry extract of which is 11.3%, was collected. Its average EPC and DCP contents are lower than 5 ppm and its MCPD content is 60 ppm. The yield of industrial resin is 15.9% (1.8% dry resin) of the weight of dry carbon.

Example 2

An activated carbon absorber with a volume of 200 liters is loaded with 100 kg of activated carbon (CECARBON® 12×40). It is saturated with water, and then a PAE resin is passed through it, whose characteristics are the following: dry extract 14%, pH=3.25, DCP content 635 ppm, inorganic chlorine content 1.58%. The rate control was set at 250 liters/hour, through the application a pressure which varied from 0.8 to 0.4 bar during the operation. Samples are taken every 100 liters and subjected to chromatographic analysis. Traces of MCPD begin to appear after an output of 200 liters. The DCP does not appear until after an output of 2,000 liters. The operation is stopped at 2,200 liters. A resin with an average dry extract of 12.15%, pH=3, DCP 5.6 ppm, MCPD 124 ppm, EPC less than 5 ppm, inorganic chlorine= 1.42%. The yield of industrial resin is thus about 22 relative to the weight of activated carbon (2.7 of dry resin).

Example 3

From the preceding resin, which has a very low DCP content, a second filtration through activated virgin carbon was carried out in the laboratory. It was possible to pass through nearly 8 kg of resin per 220 grams of CECAR-BON® 12*40 carbon, without any appearance of MCPD. Thus, a resin with an average dry extract of 11.6%, pH=2.9, DCP less than 5 ppm, and MCPD less than 5 ppm was obtained. With this second filtration, the yield of resin with practically undetectable DCP, MCPD and EPC contents is about 36 in terms of industrial resin relative to the weight of carbon used (4.2 if the resin is expressed in dry extract).

Example 4

The compositions of aqueous resins with about 12% dry extract which are untreated, treated according to the prior art (WO 92/22601-Table 1), and according to the invention (preceding example), are compared.

| Components of the PAE | untreated PAE (ppm) | PAE treated according to the prior art (ppm) | PAE treated according to the invention (ppm) |
|---|---|---|---|
| EPC | <100 | ? | ? | <5 |
| DCP | <1,000 | 25 | 13 | not measurable |
| MCPD | <1,000 | 163 | 104 | <30 |
| Cl (organic + inorganic) | ≈13,000 | 875 | 330 | ≈12,500 |

These results are interpreted as follows: a treatment with an ion exchange resin largely, though not completely, eliminates DCP and analogous products at the same time as the chlorhydroxypropyl components of the PAE. In summary, the treatment according to the present invention retains the organic and inorganic chlorines of the polymer, which is considered to have a favorable influence on the conservation of the paper's strength properties, but which brings the content of DCP and analogous products to a level which is very low, or even undetectable by the commonly used methods of gas chromatography.

Example 5

This example is of an industrial test which illustrates the impact of the resins according to the invention on the AOX content present in the white water. In a paper pulp of 10 grams/liter, 5% PAE resin is added. The pH is adjusted to 7.5. During the formation of the sheet of paper, the white water is collected and its AOX content is determined based on the DIN standard. In this way, a resin of ordinary industrial quality, whose characteristics are an average dry extract of 14%, pH=3, DCP<1,000 ppm, and MCPD<1,000 ppm, is compared with the PAE resin subjected to the treatment according to the invention, whose characteristics are an average dry extract of 12.3%, pH=3, undetectable DCP and MCPD<30 ppm.

The following results are obtained:

| Organochlorines | test specimen | ordinary resin | resin according to the invention |
|---|---|---|---|
| AOX (mg/l) white water | 0.10 | 0.58 | 0.28 |
| DCP (ppm) | undetectable | undetectable | undetectable |
| MCPD (ppm) | undetectable | undetectable | undetectable |
| Dry strength RS paper | 4,500 | 6,919 | 7,140 |
| Wet strength RH | 100 | 1,347 | 1,453 |
| RH/RS | 2.2 | 19.5 | 20.3 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for lowering epichlorohydrin (EPC), 1,3-dichloro-2-propanol (DCP) and 3-monochloro-1,2-propanediol (MCPD) content of polyamide-polyamine-epichlorohydrin (PAE) resin comprising:

(a) passing said PAE resin in the form of an aqueous solution with a dry extract between 2 and 60% through a first column having a first activated carbon bed therein to produce an EPC and DCP-diminished PAE resin;

(b) stopping step (a) when DCP first appears in the PAE resin issuing from the first column;

(c) passing the EPC and DCP-diminished PAE resin through a second column having a second activated carbon bed therein to produce an EPC, DCP and MCPD-diminished PAE resin, said second activated carbon bed being formed of carbon having an iodine number greater than 500 mg/g, and (d) stopping step (c) when MCPD first appears in the PAE resin issuing from the second column.

2. The process according to claim 1 wherein said EPC, DCP and MCPD-diminished PAE resin is an aqueous solution with a dry extract between 2 and 60%, and wherein said EPC, DCP and MCPD-diminished PAE resin comprises (i) a DCP content relative to the dry extract of less than 5 ppm, (ii) an EPC content relative to the dry extract of less than 5 ppm, (iii) a MCPD content relative to the dry extract of less than 250 ppm, and (iv) an organic chlorine content relative to the dry extract of no less than 1%, and wherein the iodine number is greater than 900 mg/g.

3. The process according to claim 2 wherein the ratio of the weight of the PAE resin (expressed in dry weight) to the weight of activated carbon used is about 2.5 for the first bed, and about 5 for the second bed.

4. A process for lowering epichlorohydrin (EPC), 1,3dichloro-2-propanol (DCP) and 3-monochloro- 1,2-propanediol (MCPD) content of polyamide-polyamine-epichlorohydrin (PAE) resin comprising:
(a) passing said PAE resin in the form of an aqueous solution with a dry extract between 2 and 60% through a first column having a first activated carbon bed therein to produce an EPC and DCP-diminished PAE resin;
(b) stopping step (a) when DCP first appears in the PAE resin issuing from the first column;
(c) passing the EPC and DCP-diminished PAE resin through a second column having a second activated carbon bed therein to produce an EPC, DCP and MCPD-diminished PAE resin, said second activated carbon bed being formed of carbon having an iodine number greater than 500 mg/g; and
(d) stopping step (c) when MCPD first appears in the PAE resin issuing from the second column;
wherein said EPC, DCP and MCPD-diminished PAE resin is an aqueous solution with a dry extract between 2 and 60%, and wherein said EPC, DCP and MCPD-diminished PAE resin comprises (i) a substantially eliminated DCP content relative to the dry extract, (ii) a substantially eliminated EPC content relative to the dry extract, (iii) a MCPD content relative to the dry extract of less than 250 ppm, and (iv) an organic chlorine content relative to the dry extract of no less than 1%.

5. The process according to claim 4 wherein the DCP content relative to the dry extract is less than 5 ppm, and wherein the EPC content relative to the dry extract is less than 5 ppm.

6. The process according to claim 4 wherein the iodine number is greater than 900 mg/g.

7. The process according to claim 4 wherein the ratio of the weight of the PAE resin (expressed in dry weight) to the weight of activated carbon used is about 2.5 for the first bed, and about 5 for the second bed.

8. A process for lowering epichlorohydrin (EPC), 1,3dichloro-2-propanol (DCP) and 3--monochloro-1,2-propanediol (MCPD) content of polyamide-polyamine-epichlorohydrin (PAE) resin comprising:
(a) passing said PAE resin in the form of an aqueous solution with a dry extract between 2 and 60% through a first column having a first activated carbon bed therein to produce an EPC and DCP-diminished PAE resin;
(b) stopping step (a) when DCP first appears in the PAE resin issuing from the first column;
(c) passing the EPC and DCP-diminished PAE resin through a second column having a second activated carbon bed therein to produce an EPC, DCP and MCPD-diminished PAE resin, said second activated carbon bed being formed of virgin carbon having an iodine number greater than 500 mg/g; and
(d) stopping step (c) when MCPD first appears in the PAE resin issuing from the second column;
wherein said EPC, DCP DCP and MCPD-diminished PAE resin is an aqueous solution with a dry extract between 2 and 60%, and wherein said EPC, DCP and MCPD-diminished PAE resin comprises (i) a substantially eliminated DCP content relative to the dry extract, (ii) a substantially eliminated EPC content relative to the dry extract, (iii) a MCPD content relative to the dry extract of less than 250 ppm, and (iv) an organic chlorine content relative to the dry extract of no less than 1%.

9. The process according to claim 8 wherein the DCP content relative to the dry extract is less than 5 ppm, and wherein the EPC content relative to the dry extract is less than 5 ppm.

10. The process according to claim 8 wherein the iodine number is greater than 900 mg/g.

11. The process according to claim 8 wherein the ratio of the weight of the PAE resin (expressed in dry weight) to the weight of activated carbon used is about 2.5 for the first bed, and about 5 for the second bed.

12. A composition for treating paper comprising an aqueous polyamide-polyamine-epichlorohydrin (PAE) resin whose dry extract is between 2 and 60%, and which comprises:
a 1,3-dichloro-2-propanol (DCP) content relative to the dry extract of the PAE resin being substantially eliminated,
a 3-monochloro-1,2-propanediol (MCPD) content being less than 250 ppm, and
an organic chlorine content relative to the dry extract of the PAE resin being no less than 1%,
wherein said composition improves the wet strength of the treated paper.

13. The composition according to claim 12 wherein (i) the DCP content relative to the dry extract of the PAE resin is less than 5 ppm, (ii) an epichlorohydrin (EPC) content relative to the dry extract is less than 5 ppm, (iii) the MCPD content relative to the dry extract is less than 250 ppm, and (iv) the organic chlorine content relative to the dry extract of no less than 1%.

14. A composition for treating paper to improve wet strength of the treated paper, said composition being made by a process for lowering epichlorohydrin (EPC), 1,3-dichloro-2propanol (DCP) and 3-monochloro-1,2-propanediol (MCPD) content of polyamide-polyamine-epichlorohydrin (PAE) resin comprising:
(a) passing said PAE resin in the form of an aqueous solution with a dry extract between 2 and 60% through a first column having a first activated carbon bed therein to produce an EPC and DCP-diminished PAE resin;
(b) stopping step (a) when DCP first appears in the PAE resin issuing from the first column;
(c) passing the EPC and DCP-diminished PAE resin through a second column having a second activated carbon bed therein to produce an EPC, DCP and MCPD-diminished PAE resin, said second activated carbon bed being formed of carbon having an iodine number greater than 500 mg/g, and
(d) stopping step (c) when MCPD first appears in the PAE resin issuing from the second column;
wherein said composition of said EPC, DCP and MCPD-diminished PAE resin is in a form of an aqueous solution with a dry extract between 2 and 60%, and wherein said EPC, DCP and MCPD-diminished PAE resin comprises (i) a substantially eliminated DCP content relative to the dry extract, (ii) a substantially eliminated EPC content relative to the dry extract, (iii) a MCPD content relative to the dry extract of less than 250 ppm, and (iv) an organic chlorine content relative to the dry extract of no less than 1%.

15. The composition of claim 14 wherein the DCP content relative to the dry extract is less than 5 ppm, and wherein the EPC content relative to the dry extract is less than 5 ppm.

16. The composition of claim 14 wherein the iodine number is greater than 900 mg/g.

17. The composition according to claim 14 wherein the ratio of the weight of the PAE resin (expressed in dry weight) to the weight of activated carbon used is about 2.5 for the first bed, and about 5 for the second bed.

18. The composition according to claim 14 wherein organic chlorine attributable to lateral chlorohydroxypropane branches of the molecules of said PAE resin is not extracted by said process of lowering EPC, DCP and MCPD of said PAE resin.

19. The process according to claim 1 wherein organic chlorine attributable to lateral chlorohydroxypropane branches of the molecules of said PAE resin is not extracted by said process of lowering EPC, DCP and MCPD of said PAE resin.

20. A method for the manufacture of paper for medical, cosmetic, or food contact uses, or papers for industrial uses requiring great purity, comprising forming a mixture comprising a paper pulp and a composition according to claim 14 and forming at least one sheet of paper from said mixture.

* * * * *

UNITED STATES PATENT AND TRADEMARK OFFICE
CERTIFICATE OF CORRECTION

PATENT NO.     : 6,342,580 B1
DATED          : January 29, 2002
INVENTOR(S)    : Henri Laurent et al.

It is certified that error appears in the above-identified patent and that said Letters Patent is hereby corrected as shown below:

Title page,
Item [73], Assignee, please delete "[73] Assignee: Atofina, Puteaux (FR)"

Signed and Sealed this

Twenty-fourth Day of August, 2004

JON W. DUDAS
*Director of the United States Patent and Trademark Office*